United States Patent
Sundaram

(10) Patent No.: US 10,224,641 B2
(45) Date of Patent: Mar. 5, 2019

(54) SYSTEMS AND METHODS FOR TRANSMISSION AND RECEPTION OF RADIO WAVES IN A FOCAL PLANE ANTENNA ARRAY

(71) Applicant: G. A. Shanmugha Sundaram, Coimbatore (IN)

(72) Inventor: G. A. Shanmugha Sundaram, Coimbatore (IN)

(73) Assignee: AMRITA VISHWA VIDYAPEETHAM, Coimbatore (IN)

( * ) Notice: Subject to any disclaimer, the term of this patent is extended or adjusted under 35 U.S.C. 154(b) by 241 days.

(21) Appl. No.: 15/090,317

(22) Filed: Apr. 4, 2016

(65) Prior Publication Data
US 2016/0359236 A1    Dec. 8, 2016

(51) Int. Cl.
*H01Q 1/24*      (2006.01)
*H01Q 19/13*     (2006.01)
(Continued)

(52) U.S. Cl.
CPC .............. *H01Q 19/13* (2013.01); *H01Q 1/24* (2013.01); *H01Q 1/36* (2013.01); *H01Q 15/16* (2013.01); *H01Q 15/244* (2013.01); *H04L 5/04* (2013.01)

(58) Field of Classification Search
CPC ........ H01Q 21/00; H01Q 21/28; H01Q 19/17; H01Q 15/16; H01Q 1/36; H01Q 1/24
(Continued)

(56) References Cited

U.S. PATENT DOCUMENTS 3,965,475 A  *   6/1976   Deerkoski ........... G01S 13/4409
                                                   342/374
8,432,884 B1     4/2013   Ashrafi
(Continued)

FOREIGN PATENT DOCUMENTS

WO    2012175629 A1    12/2012
WO    2014016655 A1     1/2014
WO    2014104911 A1     7/2014

OTHER PUBLICATIONS

Deng C., et al., "Generation of OAM Radio Waves Using Circular Vivaldi Antenna Array," International Journal of Antennas and Propagation, Apr. 2013, pp. 01-07.
(Continued)

*Primary Examiner* — Hai Tran
(74) *Attorney, Agent, or Firm* — Convergence Intellectual Property Law P.C.; Jonathan Garfinkel

(57) ABSTRACT

Systems and methods for transmitting and receiving radio waves includes a parabolic dish, a focal plane antenna array configuration antenna elements arranged in a circular array configuration with array elements positioned along circumference of rings with a distance between each element and coupled a focal disc positioned along a focal plane of the parabolic dish. The array is configured to transmit and receive radio beam patterns with one or more Orbital Angular Momentum states 'l' via a transceiver feed assembly. The transceiver includes a transmitter adapted to alter excitation phase of the radio beams of successive elements and generate helical wave fronts in the far-field, and a receiver to enhance the received wave fronts. A total field received by the array configuration is then calculated by a superposition of the fields received by each of the elements.

15 Claims, 10 Drawing Sheets

(51) Int. Cl.
*H01Q 15/16* (2006.01)
*H01Q 1/36* (2006.01)
*H01Q 15/24* (2006.01)
*H04L 5/04* (2006.01)

(58) Field of Classification Search
USPC .......................... 343/702, 700 MS, 836, 893
See application file for complete search history.

(56) References Cited

U.S. PATENT DOCUMENTS

| | | | |
|---|---|---|---|
| 2013/0235744 A1* | 9/2013 | Chen | H04L 47/82 370/252 |
| 2014/0057576 A1* | 2/2014 | Monte | H01Q 3/02 455/73 |

OTHER PUBLICATIONS

Mohammadi S. M., et al., "Orbital Angular Momentum in Radio: A System Study," IEEE Transactions on Antennas and Propagation, Feb. 2010, pp. 01-07.

Sjoholm J., et al., "Angular Momentum of Electromagnetic Radiation Fundamental Physics Applied to the Radio Domain for Innovative Studies of Space and Development of New Concepts in Wireless Communications," Uppsala University, May 2007, pp. 1-196.

* cited by examiner

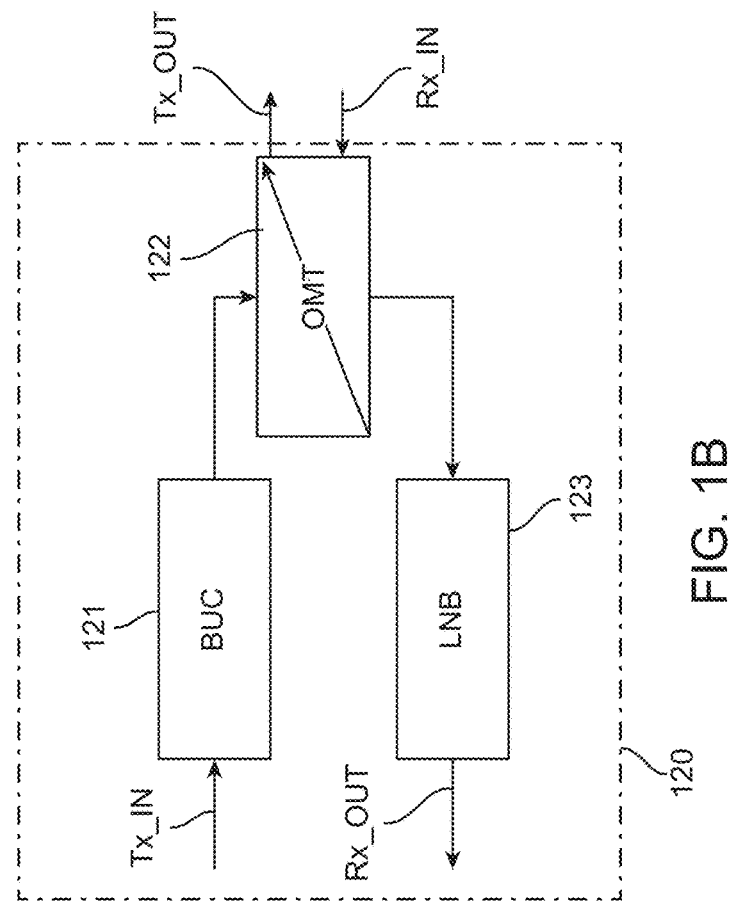
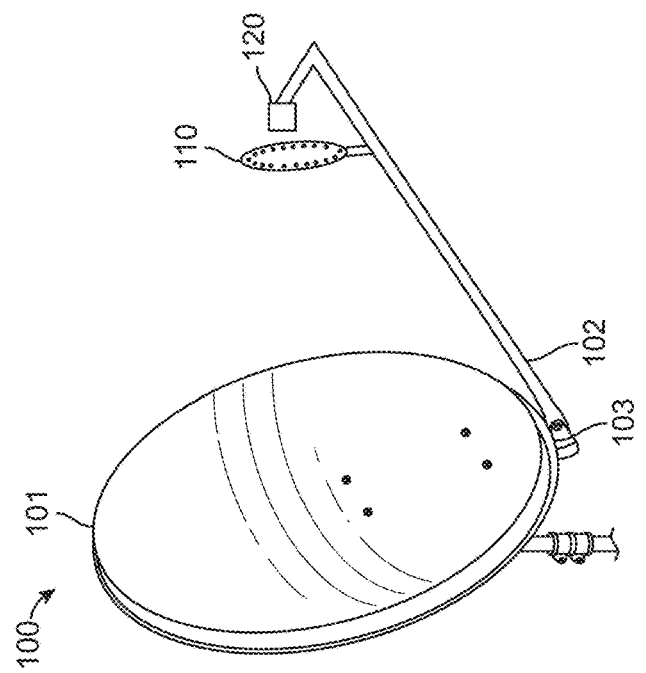
FIG. 1B
FIG. 1A

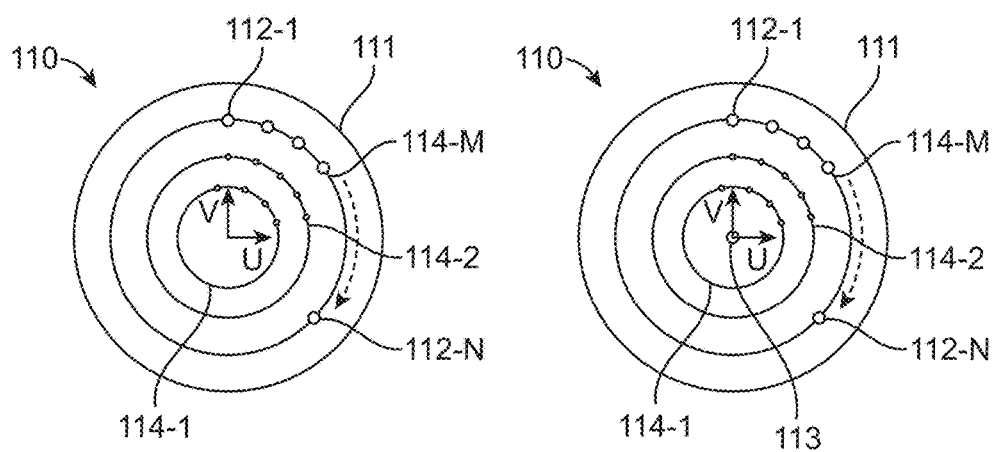

SYSTEMS AND METHODS FOR TRANSMISSION AND RECEPTION OF RADIO WAVES IN A FOCAL PLANE ANTENNA ARRAY

CROSS-REFERENCE TO RELATED APPLICATIONS

This application claims priority to Indian provisional patent application No. 1790/CHE/2015 filed on Apr. 3, 2015, the full disclosure of which is incorporated herein by reference.

FIELD OF THE INVENTION

The present disclosure relates generally to communication systems in particular to focal plane antenna array configurations for transmission and reception of radio waves using orbital angular momentum (OAM).

DESCRIPTION OF THE RELATED ART

Communication systems include various subsystems such as transmitter, receiver, channel encoder and decoder, and an antenna, to communicate with other remote terminals via wired or wireless mode of operation with the available spread spectrum. As the number of remote terminals increases there may be heavy congestion across the allocated spread spectrum. Such heavy congestion has led toward research into better ways of utilizing given spectrum. Since wireless communication has become ubiquitous, there is increasing demand for novel techniques which use the existing spectrum efficiently. Various modulation, polarization and dense channel coding techniques have been implemented so as to increase the efficiency of the available bandwidth.

Electromagnetic waves used in RF communication systems include both energy and momentum components into the far zone. Such momentum comprises both linear and angular profile support contributions. Communication devices such as mobile phones having antenna utilize linear momentum and linear polarization to increase the reception of the communication device, whereas other communication devices such as GPS utilize angular momentum and circular polarization for determining orientation between the device and the GPS satellite.

Encoding using OAM has been associated with optics and is used with holograms to compress information delivery. However, recent technological advancements have steered toward OAM in RF communication system applications to improve the data transmission rate for both short and long-range communication. Multiple Input Multiple Output (MIMO) architectures which are widely used in current wireless communication systems, utilize various types of polarization to reuse the spread spectrum.

PCT Publication No. WO 2014104911 A1 titled "Method and apparatus for generating electromagnetic beams" by Dudorov et al, discloses a method and apparatus with antenna arrays including antenna elements such as pyramidal horns arranged along a circular geometry for receiving electromagnetic beams with variable orbital angular momentum, OAM states.

PCT Publication No. WO 2014016655 A1 titled "Modulation technique for transmitting and receiving radio vortices" by Berretta et al. discloses a device for receiving digital input signals and generating OAM modes for radio communication. Each received input has a respective space modulation associated with a respective OAM mode and a respective topological charge to generate a corresponding modulated digital signal and OAM mode. Further, the device provides an output digital signal based on the modulated digital signal.

U.S. Publication No. 20130235744 A1 titled "Communication system using orbital angular momentum" to Chen et al. discloses different data communication architectures to deliver a wide variety of content, including audio and video content, to consumers. The architectures may utilize orbital angular momentum to deliver more bandwidth across multiple channels than any single communication channel can carry. In some implementations, the communication architectures distribute data across multiple orbital angular momentum channels in a bonded channel group.

SUMMARY OF THE INVENTION

Devices, systems and methods including a focal plane antenna array configuration for transmission and reception of radio waves using Orbital Angular Momentum (OAM) states are disclosed.

In one aspect, a focal plane antenna array system for transmitting and receiving radio waves comprises a parabolic dish and a focal plane antenna array. Further, the focal plane antenna array configuration comprises one or more antenna elements arranged in a circular array configuration with N array elements positioned along a circumference of M rings with a distance between each element. The array elements are coupled to a focal disc positioned along a focal plane of the parabolic dish such that the array is configured to, transmit radio beam patterns with one or more orbital angular momentum (OAM) states 'l' via a transceiver feed assembly coupled to the parabolic dish. The transceiver comprises a transmitter adapted to alter excitation phase of the radio beams of successive elements to generate helical wave fronts in the far-field. Further, the system is configured to receive radio beam patterns with one or more orbital angular momentum (OAM) states via a transceiver feed assembly coupled to the parabolic dish. The transceiver comprises a receiver adapted to enhance the received helical wave fronts optimally to maximize the received signal and calculate a total field received by the array configuration through superposition of the fields received by each of the elements.

In another aspect, the circular array configuration is one of a uniform circular array-Type I with N equidistantly placed array elements, where M is 1; a uniform circular centred array-Type II with N equidistantly place array elements, where M is 1 and further including a centrally place element; a planar uniform circular array-Type II, with N array elements arranged equidistantly in M rings where M>1, or planar uniform circular centred array-Type IV with N array elements arranged equidistantly in M rings where M>1 and further including a centrally placed element. The one or more OAM states are in a range: $-N/2 < l < N/2$. 4, further the OAM states bound transmission of the generated helical wave fronts corresponding to a value 'l' selected from 0, 2, or 4. The antenna array elements are configured to control the current and phase for each element to increase the total field, where the total field $E_{total}$ is obtained by $E_{total} = E_{singleelement} \times AF$ wherein, AF is array factor and $E_{singleelement}$ the field from one single element.

In various embodiments, the circular array configuration is a uniform circular array-Type I configuration including nineteen elements arranged in one ring on the focal disc with radius equal to 1.98 times the wavelength and distance between the elements of 0.65 times the wavelength.

In another embodiment, the circular array configuration is a planar uniform circular array-Type III with 9 antenna elements arranged along the circumference of an inner circle with radius 1.25 times the wavelength and 10 antenna elements along the circumference of an outer circle with radius 1.98 times the wavelength. In another aspect, the transceiver includes a Low Noise Block (LNB) converter as the receiver, a Block Up Converter (BUC) as the transmitter.

In another aspect, a method for transmitting and receiving generated radio waves via a focal plane antenna array configuration is disclosed. A parabolic dish coupled to a focal plane antenna array configuration comprising, antenna elements arranged in a circular array configuration with N array elements positioned along circumference of M rings with a distance between each element and coupled to a focal disc positioned along a focal plane of the parabolic dish and a transceiver feed assembly coupled to the parabolic dish are provided. Radio beam patterns with one or more Orbital Angular Momentum (OAM) states are transmitted to the antenna elements via the transceiver feed assembly. The transmitting comprises altering excitation phase of the radio beams of successive elements to generate helical wave fronts in the far-field. The method further comprises receiving radio beam patterns with one or more OAM states via the transceiver feed assembly. The receiving comprises calculating a total field received by the array configuration through superposition of the fields received by each of the elements.

This and other aspects are described further herein.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 1A is a side perspective view of focal plane antenna array system for transmission and reception of radio waves incorporating a parabolic dish embedded with antenna elements arranged in a circular array configuration on a focal disc via a transceiver feed assembly.

FIG. 1B illustrates transceiver feed assembly components of a focal plane antenna array system for transmission and reception of radio waves.

FIG. 1E-1F illustrate another embodiment of a planar uniform circular array-Type III configuration and a planar uniform circular centered array Type IV configuration with antenna elements arranged on a focal disc along a focal plane.

DETAILED DESCRIPTION OF THE EMBODIMENTS

Figure 1C:
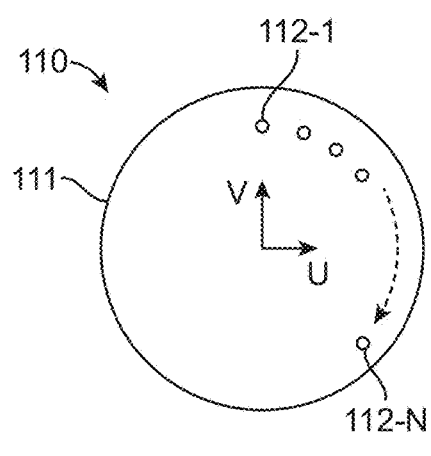
FIG. 1C-1D illustrates one embodiment of a uniform circular array-Type I configuration and a uniform circular centered array-Type II configuration with antenna elements arranged on a focal disc along a focal plane.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

Devices, systems and methods, for transmitting and receiving radio waves in a focal plane antenna array configuration using Orbital Angular Momentum (OAM) states, are further described herein with reference to the figures. The devices, systems and methods in various embodiments could also be an addition to an existing antenna system for expanding the bandwidth utilization and spectral efficiency in communication systems using OAM states. In an embodiment as shown in FIG. 1A, a focal plane antenna array system 100 for transmitting and receiving radio waves incorporating a parabolic dish 101 and a focal plane antenna array 110 embedded with antenna array elements (not shown in the figure) arranged in a circular array configuration via a transceiver feed assembly 120. The focal plane antenna array configuration 110 comprises antenna array elements arranged in a circular array configuration with a number of antenna array elements 'N' positioned along circumference of a ring on a focal plane corresponding to a disc, referred to as "focal disc". The parabolic dish 101 is coupled to the focal plane antenna array configuration 110 and the transceiver feed assembly 120 of the system 100.

In one embodiment FIG. 1B illustrates components of the transceiver feed assembly 120 for transmission and reception of radio waves via the focal plane antenna array system 100 of FIG. 1A. The transceiver feed assembly 120 comprises a transmitter 121 and a receiver 123. The transceiver feed assembly 120 may include front-end RF electronics components such as Low Noise Block (LNB) converter as the receiver 123, Block Up Converter (BUC) as the transmitter 121, and Ortho Mode Transducer (OMT) as routing component 122. The transmitter 121 is coupled to source (not shown in the Figure), that generates radio waves carried along a RF cable conduit 102, where the radio waves are electromagnetic signals such as audio, video, or a combination of audio and video signals. Further, the parabolic dish 101 along with the RF cable conduit 102 is supported by offset feed support 103.

In one embodiment, the generated radio waves from the source are transmitted Tx_IN via the RF cable conduit 102 to the BUC 121 so as to transmit out radio waves Tx_OUT in microwave frequency range of at least 2 GHz in the free space via the OMT 122, the focal plane antenna array configuration 110 and radiated towards the parabolic dish 101. The source, BUC 121 and the OMT 122 are electrically connected. The transmitted radio waves Tx_OUT may include audio or video or in combination of audio or video electrical signals. The BUC 121 uplinks the transmitted radio waves Tx_IN via the OMT 122, such that the signal received at the OMT 122 is routed via the antenna array elements arranged on the focal plane antenna array configuration 110.

The uplink is conceded for communication by transferring the radio waves Tx_OUT as helical wave fronts from an earth station to one or more satellites (not shown in the figure) using focal plane antenna array system 100 as shown in FIG. 1A. In various embodiments, the BUC 121 determines the bandwidth or frequency bands allotted for each channel. The frequency bands may be of L band, C band, K band, Ku band, or Ka band. If the number of channels allotted in the frequency bands is deficient, the BUC 121-1 traverses from a lower to a higher frequency band.

In another embodiment, the parabolic dish 101 is coupled to the receiver 123 of the system 100, where the receiver 123 is a LNB. The LNB 123 may include one or more subcomponents, such as Low Noise Amplifier (LNA), frequency mixer, local oscillator and IF amplifier. The LNB 123 may receive the radiated electrical signal from one or more satellites (not shown in the Figure) and one or more focal plane antenna array systems 100. The received signals could be amplified by LNB 123, which further down converts the received signal comprising a block of frequencies to intermediate frequencies in range of 950 MHz to 2150 MHz's The OMT 122 is coupled to the LNB 123 to receive Rx_IN, the transmitted radio waves radiated in free space via the focal plane antenna array configuration 110. The OMT 122 and LNB 123 are electrically connected via RF conduits 102 and the received radio waves Rx_IN may include audio, video or a combination of audio and video electromagnetic signals.

Further, the transmitted helical wave fronts in free space are downlinked via one or more satellites (not shown in the figure) or one or more systems 100 having focal plane antenna array configuration 110 such that the received radio waves Rx_IN are electrically directed to the OMT 122. Further, the electrical signal Rx_IN from the OMT 122 is directed to the LNB 123 via RF cable conduit 103. The helical wave fronts received by the LNB 123 may be processed by the LNA optimally to maximize the amplitude of the received wave front. Further, the receiver 123 calculates a total field of the maximized wave front received by the array configuration by a superposition of the fields received by each of the antenna elements.

Further, in some embodiments the aforementioned antenna array elements in the circular array configuration are configured to transmit radio beam patterns directed to the parabolic dish 101 with one or more OAM states 'l' which are mutually orthogonal in spatial domain, where the spatial domain is superimposed with different time, frequency and incident angles which may include both real and imaginary components. In some embodiments the one or more OAM states correspond to a value 'l' selected from 0, 2, and 4. In some embodiments the transmitter 121, OMT 122, and antenna array elements in the circular array configuration, further alter excitation phase of the radio beams of successive elements to generate helical wave fronts in far-field for any given size and shape of the antenna array element, the focal plane antenna array configuration 110, the focal disc, and the parabolic dish 101. In various embodiments of the invention, the focal plane antenna array system 100 as shown FIG. 1A, the antenna elements arranged on the focal plane antenna array configuration 110 may be configured in a circular manner along the circumference of the focal disc and/or one antenna element at the center of the focal disc as shown in FIG. 1C-1F. Such an arrangement of antenna elements in circular manner and center of the focal disc may be referred as circular array configuration 110.

Figure 1D:
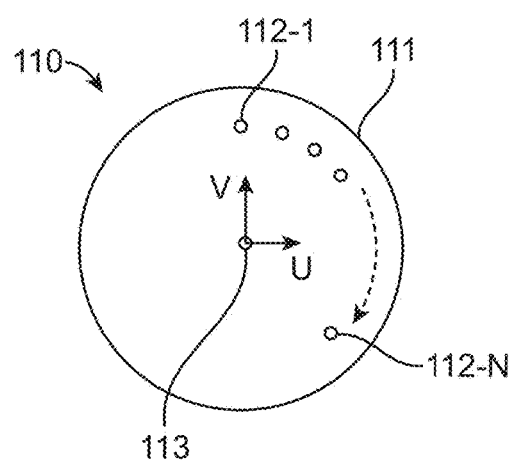

In embodiments as shown in FIG. 1C the circular array configuration 110 may be a uniform circular array having an odd number of elements 112-1 . . . 112-N, designated as uniform circular array-Type I. In another embodiment as shown in FIG. 1D the circular array configuration 110 having an even number of elements 112-1 . . . 112-N, designated as a uniform circular centered array-Type II. Further, in Type II a one antenna element 113 is positioned at center of the focal disc 111. In yet other embodiments as illustrated in FIG. 1E, the circular array configuration 110 having antenna elements 112-1 . . . 112-N may be arranged in multiple rings 114-1 . . . 114-M. Further, the antenna elements 112 may be arranged in two rings comprising an inner 114-1 and an outer ring 114-M, designated as a planar uniform circular array-Type III having odd number of elements 112-1 . . . 112-N in an inner ring 114-1 and an even number of elements 112-1 . . . 112-N in an outer ring 114-M. In various embodiments as illustrated in FIG. 1F, the circular array configuration 110 having antenna elements 112 may be arranged in multiple rings 114-M. Further the antenna elements 112 may be arranged in two rings comprising an inner 114-1 and an outer ring 114-M, designated as a planar uniform circular centred array-Type IV having an equal odd number of elements 112-1 . . . 112-N in the inner 114-1 and outer rings 114-M. Further, in Type IV a one antenna element 113 is positioned at center of the focal disc 111.

In various embodiments of the invention, the aforementioned four different Types of circular array configurations 110 are configured with one or more OAM states. In one embodiment, for OAM state 'l'=0 there is no possibility of OAM modulation as helical wave fronts are nullified and the transmitted radio beam patterns are circularly polarized. In one embodiment, with OAM state 'l'=2, helical wave fronts with OAM modulation are generated and transmitted and the transmitted radio beam patterns are right hand circularly polarized with two fold helix. In one embodiment with OAM state 'l'=4, helical wave fronts with OAM modulation are generated and transmitted, and the transmitted radio beam patterns are right hand circularly polarized with four fold helix.

In various embodiments, the performance of system 100 is optimized with one or more antenna array elements 112 arranged in different configurations 110 are further described in the following description and examples. Such an arranged antenna array elements 112 in one of the circular array configuration 110 are suitable for controlling the current and phase for each element. The total field as received by the LNB 123 from one or more antenna array elements 112 arranged in the circular array configuration 110 on the focal disc 111 is calculated by a superposition of the fields from each element 112. Further, the total field is obtained by the pattern multiplication rule.

The electrical size and performance of the circular array configuration 110 can be increased by using multiple elements in a geometrical configuration and controlling the current and phase for each element. Further, the geometry of the circular array for different configurations is determined by the wavelength along with the circumference of the focal disc. For a circular array configuration 110 with the elements 112 along the circumference of 114-M rings, the AF is given below in the equation [1]:

$$AF(\theta,\emptyset) = \sum_{m=1}^{M} \sum_{n=1}^{N} \alpha_{mn} e^{i(k\alpha_{mn}\sin\theta\cos(\emptyset-\emptyset_{mn}))} \quad [1]$$

Where, N is the number of antenna elements, $\emptyset_{mn}$ is the azimuthal angle of the element $n^{th}$ in the $m^{th}$ ring as mentioned in the below equation [2]:

$$\emptyset_{mn} = \frac{2\pi mn}{N} \quad [2]$$

$\alpha_{mn}$ is the excitation coefficient, expressed in the below equation [3]:

$$I_{mn} e^{j\alpha_{mn}} \quad [3]$$

The total field is the product of the Array Factor (AF) and the field from one single element represented in the following equation [4]:

$$E_{total} = E_{single\ element} \times AF \quad [4]$$

The generation of OAM for the aforementioned array configuration 110 is obtained by a relative offset in the phase between the elements with a phase of $l\emptyset_{mn}$ and aforementioned equation [2] is re-expressed with the following equation [5]:

$$AF(\theta,\emptyset) = \sum_{m=1}^{M} \sum_{n=1}^{N} I_{mn} e^{i(k\alpha_{mn}\sin\theta\cos(\emptyset-\emptyset_{mn})+\alpha_{mn}+OAM)} \quad [5]$$

Where, Orbital Angular Momentum, OAM is expressed in equation [6]:

$$OAM = \frac{2\pi mnl}{N} \quad [6]$$

In the embodiment, the circular array element configuration 110 may include either N=1 to 19 or N=1 to 18 including the one antenna element 113 positioned at center of (1, 18) elements in total for all four different Types of array configuration 110, where the AF is obtained by equation [4]. The radiation beam pattern for OAM states may include a corresponding value 0, 2, and 4. Each of the array elements 112 is an isotropic radiator, to transmit the generated helical wave front with equivalent intensity of radiation in all direction.

Uniform Circular Array-Type I

In one embodiment, the system 100 (not shown in the figure) with focal plane antenna array configuration 110 as shown in FIG. 1C illustrates one embodiment of a uniform circular array-Type I configuration 110 includes antenna elements 112-1 . . . 112-N arranged in the uniform circular array-Type I configuration 110 on the focal disc 111. The uniform circular array-Type I configuration 110 includes nineteen elements 112-1 . . . 112-N, where N=1 to 19, are positioned along the circumference of the focal disc 111. Such that the nineteen elements 112-1 . . . 112-N are positioned with a distance along the circumference of a circle with radius equal to 1.98 times of the wavelength and the distance between the elements is 0.65 times the wavelength, where the Array Factor-1 (AF1) for the uniform circular array Type-I configuration 110 is expressed by the following equation [7]:

$$AF1(\theta,\emptyset) = \sum_{n=1}^{N} I_0 e^{i(k\alpha\sin\theta\cos(\emptyset-\emptyset_n)+\alpha_n+OAM)} \quad [7]$$

$$\emptyset_n = \frac{2\pi n}{N} \quad [8]$$

$$\alpha_n = -k\alpha\sin\theta_0\cos(\emptyset_0-\emptyset_n), \quad [9]$$

where, the wavelength is determined by, $$\lambda = \frac{c}{f},$$

'c' is speed of light denoted as $3\times10^8$ m/s, 'f' is the frequency selected from one of the following frequency bands such as L band, C band, K band, Ka band, Ku band, and other frequency ranges such as Ultra high frequency (UHF), Super High Frequency (SHF), and Extremely High Frequency (EHF). The frequency f may have lower frequency $f_{lower}$ and higher frequency $f_{higher}$ denoted as, $f=f_{lower}+f_{higher}$. Further, Orbital Angular Momentum, OAM for aforementioned array configuration 110 is expressed in equation [10]:

$$OAM = \frac{2\pi nl}{N} \quad [10]$$

Uniform Circular Centered Array-Type II

In another embodiment, the system 100 (not shown in figure) with focal plane antenna array 110 as shown in FIG. 1D illustrates one embodiment of a uniform circular centered array-Type II configuration 110 includes antenna array elements 112-1 . . . 112-N arranged in the uniform circular centered array-Type II configuration 110 on the focal plane represented as V-U axis along the focal disc 111. The uniform circular centered array-Type II configuration 110 include eighteen elements N=1 to 18 are uniformly positioned along the circumference of a circle or disc 111 with radius equal to 1.98 times the wavelength and one element 113 in the center (1, 18), where the Array Factor-2 (AF2) for the uniform circular centered array-Type II configuration 110 is expressed by following equation [11]:

$$AF2(\theta,\emptyset) = 1 + \sum_{n=1}^{N} I_0 e^{i(k\alpha\sin\theta\cos(\emptyset-\emptyset_n)+\alpha_n+OAM)} \quad [11]$$

Planar Uniform Circular Array-Type III

In yet another embodiment, the system 100 (not shown in the figure) with focal plane antenna array configuration 110 as shown in FIG. 1E illustrates yet another embodiment of a planar uniform circular array-Type III configuration 110 with antenna array elements 112-1 . . . 112-N arranged on a focal disc 111 along the focal plane. The planar uniform circular array-Type III configuration 110 include one or more antenna array elements 112-1 . . . 112-N are arranged in concentric circle such that the antenna elements N=11 to 19 arranged along the circumference of an inner circle 114-1 with radius 1.25 times of wavelength. Further, the antenna array elements with N=1 to 10 are arranged along the circumference of an outer circle 114-M with radius 1.98 times the wavelength (9, 10), where the Array Factor-3 (AF3) for the planar uniform circular array configuration 110 is expressed by following equation [12]:

$$AF3(\theta, \emptyset) = \sum_{m=1}^{m} \sum_{n=1}^{N} I_0 e^{i(ka_{mn}\sin\theta\cos(\emptyset-\emptyset_{mn})+\alpha_{mn}+OAM_2)} \quad [12]$$

$$\emptyset_n = \frac{2\pi mn}{N} \quad [13]$$

$$\alpha_{mn} = -ka\sin\theta_0\cos(\emptyset_0 - \emptyset_n) \quad [14]$$

Where, Orbital Angular Momentum, $OAM_2$ for aforementioned array configuration 110 is expressed in equation [15]:

$$OAM_2 = \frac{2\pi nml}{N} \quad [15]$$

Planar Uniform Circular Centered Array-Type IV

In various other embodiments, the system 100 (not shown in the figure) with focal plane antenna array configuration 110 as shown in FIG. 1F illustrates one embodiment of a planar uniform circular centered array-Type IV configuration 110 include antenna array elements 112-1 . . . 112-N arranged in the planar uniform circular centered array-Type IV configuration on the focal disc 111 along the focal plane. The planar uniform circular centered array-Type IV configuration 110 include one or more antenna elements 112-1 . . . 112-N arranged in concentric circle 114-1 . . . 114-M such that the antenna elements N=10 to 18 are arranged along the circumference of an inner circle 114-1. Further, the antenna elements N=1 to 9 are arranged along the circumference of an outer circle 114-M with an one element 113 in the center (1, 9, 9), where the Array Factor-4 (AF4) for the planar uniform circular array-Type IV configuration 110 is expressed by following equation [16]:

$$AF4(\theta,\emptyset) = \sum_{m=1}^{M} \sum_{n=1}^{N} I_0 e^{i(ka\sin\theta\cos(\emptyset-\emptyset_{mn})+\alpha_{mn}+OAM_1)} \quad [16]$$

As mentioned in the above embodiments, there may be of one or more OAM states for a particular wave which may be more feasible than others for generating and transmitting of the radio electrical signals, thereby bounding the transmission within a range of $-N/2 < l' < N/2$, where N is the total number of array elements 112. Similarly, more feasible to generate a pure rotating phase wave front for smaller values of 'l' rather than larger ones.

Figure 2A:
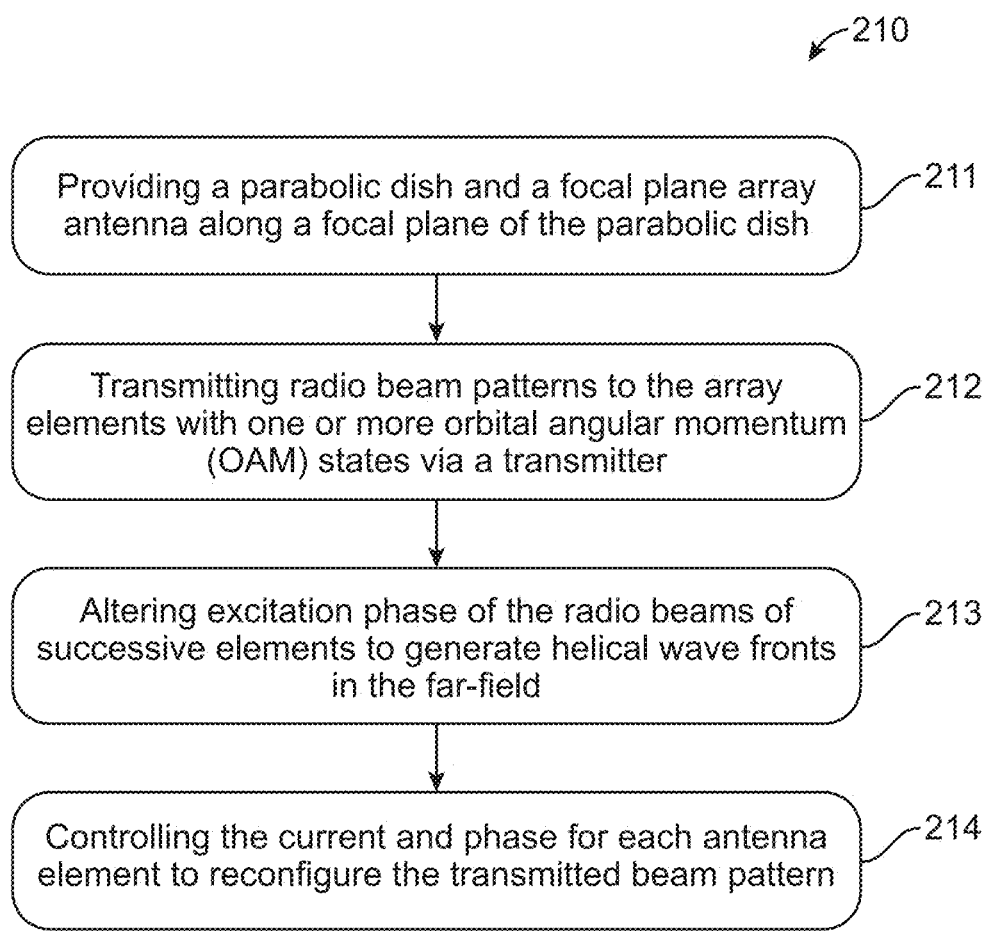
FIG. 2A illustrates a method for transmitting radio waves incorporating a parabolic dish embedded with antenna elements arranged in a circular array configuration on a focal disc via a transceiver feed assembly using Orbital Angular Momentum (OAM) states.

In one aspect, a method 210 is disclosed as shown in FIG. 2A for transmitting radio waves incorporating the system and antenna configurations already disclosed in FIG. 1A to 1F using OAM states. The method involves in step 211 providing a parabolic dish 101 coupled to a focal plane antenna array configuration 110 (as in FIGS. 1A-1B) comprising antenna elements (as in FIG. 1A) arranged in a circular array configuration 110 with N array elements 112 positioned along the circumference of M rings 114 with a distance between each element and coupled to a focal disc 111 positioned along of a focal plane of the parabolic dish 101. In the next step 212 the focal plane antenna array configuration 110 (as in FIG. 1A), is used for transmitting radio beam patterns with one or more OAM states via the transceiver feed assembly 120 coupled to the parabolic dish 101 (as in FIG. 1A). In step 213, the excitation phase of the radio beams of successive elements of the antenna array 112 are altered or activated to generate helical wave fronts in the far-field. The method further involves in step 214, controlling the current and phase for each antenna element (as in FIG. 1A) through the transmitter 121 (as shown in FIG. 1B) to increase the total transmitted field.

Figure 2B:
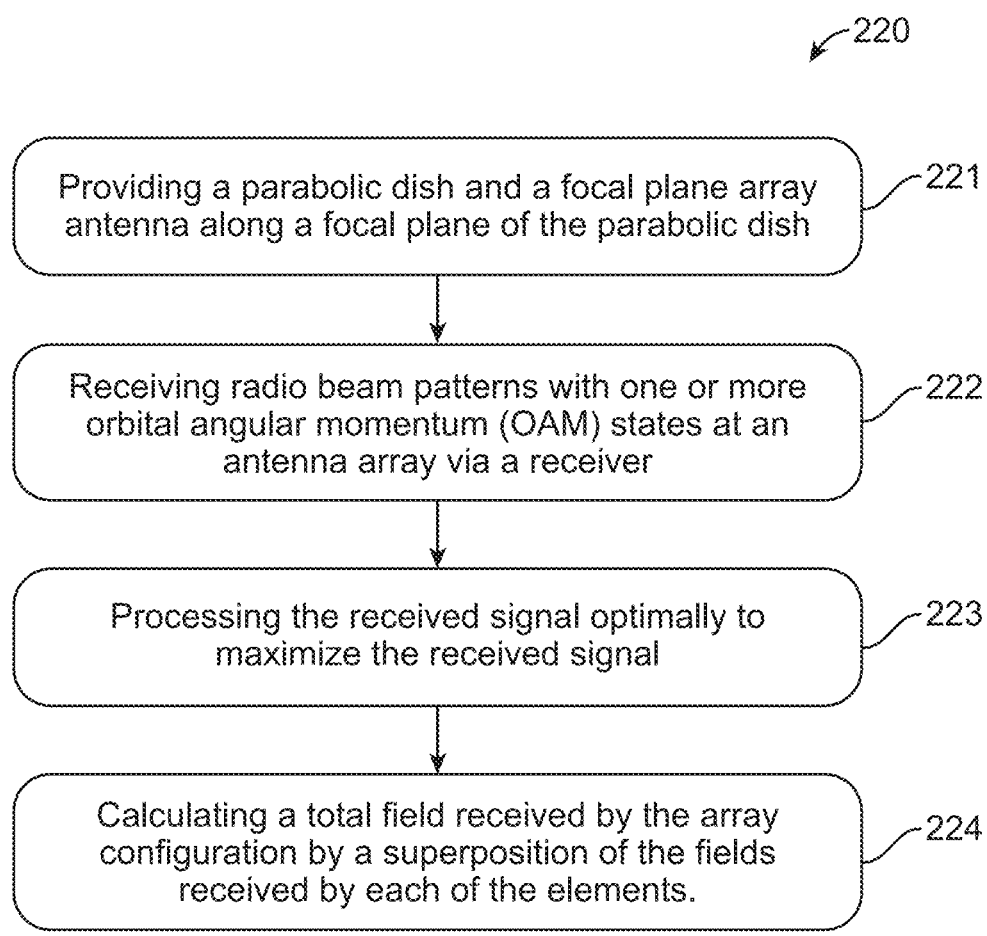
FIG. 2B illustrates a method for receiving radio waves incorporating a parabolic dish embedded with antenna elements arranged in a circular array configuration on a focal disc via a transceiver feed assembly using Orbital Angular Momentum (OAM) states.

Further, in another aspect, FIG. 2B illustrates a method 220 for receiving radio waves incorporating the system and antenna configurations already disclosed in FIG. 1A to 1F using OAM states. The method involves in step 221 providing a parabolic dish 101 coupled to a focal plane antenna array configuration 110 (as in FIGS. 1A-1B) comprising antenna elements 111 (as in FIG. 1C-1F) arranged in a circular array configuration with N array elements positioned along the circumference of 114-M rings with a distance between each element and coupled to a focal disc 111 positioned along of a focal plane of the parabolic dish 101. In step 222, the focal plane antenna array 110 (as in FIG. 1A) receives the radio beam patterns with one or more OAM states via the transceiver feed assembly 120 (as in FIG. 1A). In the next step 223, the transceiver 120 (as in FIG. 1B) comprising receiver 123 (as in FIG. 1B) is used to process the received helical wave fronts optimally to maximize the amplitude of the received signal. Finally, in step 224 a total field received by the array configuration 110 is calculated by a superposition of the fields received by each of the elements. In one aspect the total field is obtained by a pattern multiplication rule. The superposition of the fields from each element is a function of shape of the array, phase, current amplitude, and number of elements.

The method embodiments shown in FIGS. 2A and 2B are applicable to the parabolic dish 101 (as in FIG. 1A) embedded with antenna elements 112 (as in FIG. 1A) arranged in a circular array configuration 110 on a focal disc 111 as shown in FIGS. 1C-1F respectively, via a transceiver feed assembly 120 (as in FIG. 1A) using Orbital Angular Momentum (OAM) states.

While the invention has been disclosed with reference to the foregoing embodiments, it will be understood by those skilled in the art that various changes may be made and equivalents may be substituted without departing from the scope of the invention. In addition, many modifications may be made to adapt to a particular situation or material the teachings of the invention without departing from its scope. The embodiments described above are further illustrated with reference to the following examples, which however are not to be construed as limiting the scope of the invention as defined by the claims.

EXAMPLES

Example 1

Figure 3A:
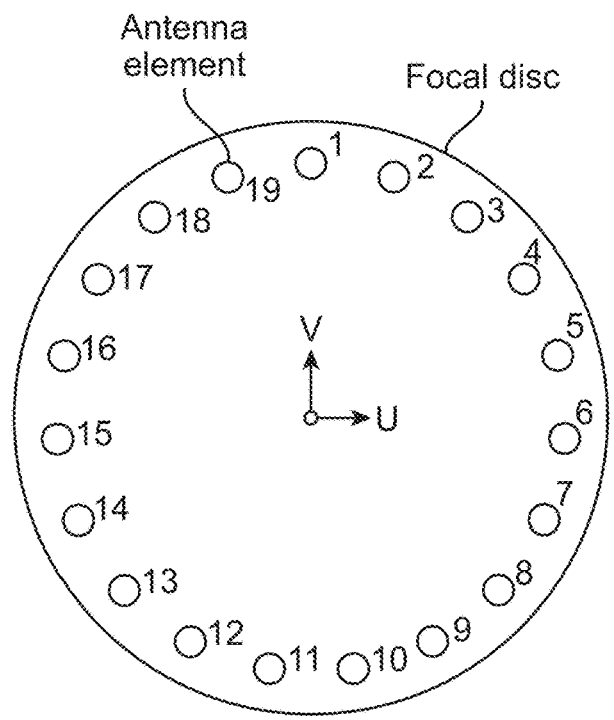
FIG. 3A illustrates an example of a uniform circular array-Type I configuration including nineteen elements along the circumference arranged on a focal disc along a focal plane.

The geometry of various circular array configurations is described herein with examples. In an example of a uniform circular array-Type I configuration is shown in FIG. 3A, including nineteen elements along the circumference arranged on a focal disc along a focal plane. The uniform circular array-Type I configuration includes nineteen elements N=1 to 19 that are positioned along the circumference of the focal disc, spaced equidistant along the circumference of a circle with radius equal to 1.98 times of the wavelength and the distance between the elements is 0.65 times the wavelength.

Figure 3B:
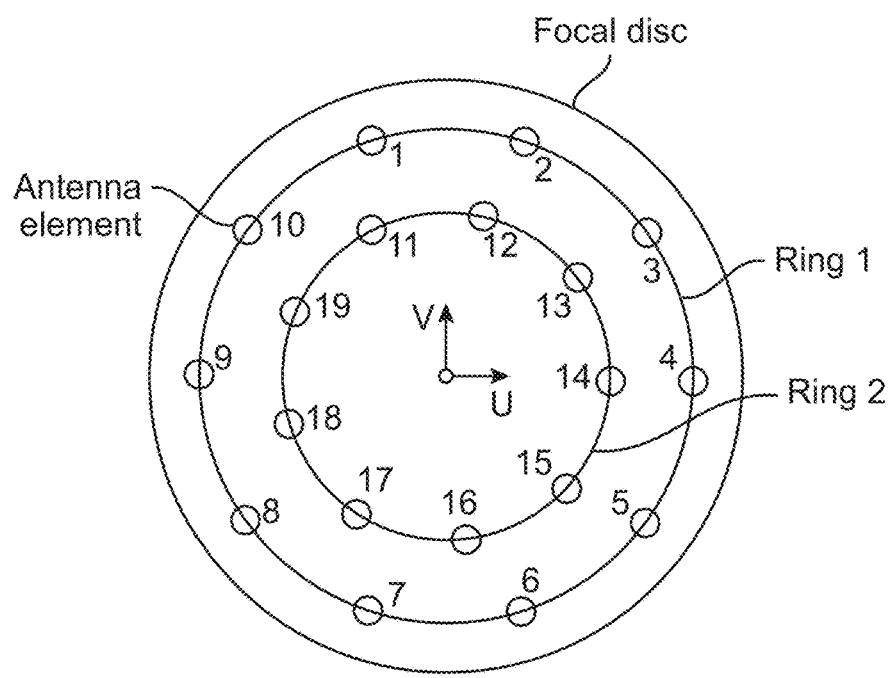
FIG. 3B illustrate an example of a planar uniform circular centered array-Type III with 10 antenna elements in ring 1 and 9 antenna element in ring 2, and the ring 1 and ring 2 are arranged on a focal disc along a focal plane.
Figure 4A:
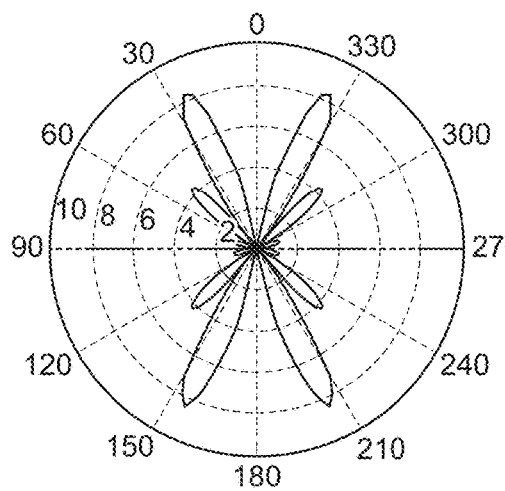
FIGS. 4A to 4D illustrate 2D representations of the transmitted and received radiation patterns at a circular array-Type I, Type II, Type III and Type IV respectively, for OAM state 'l'=4.
Figure 4B:
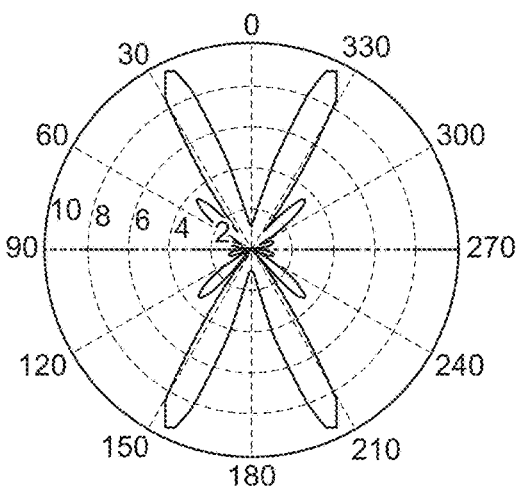
Figure 4C:
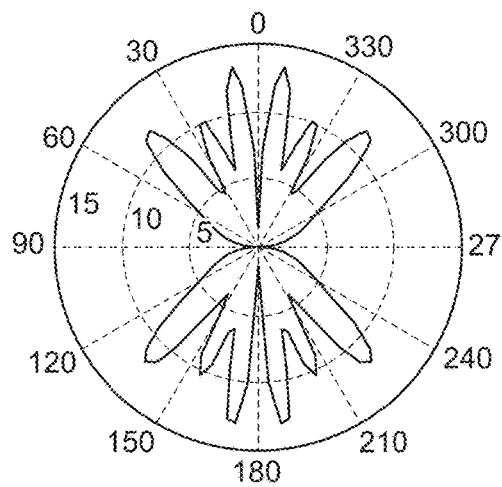
Figure 4D:
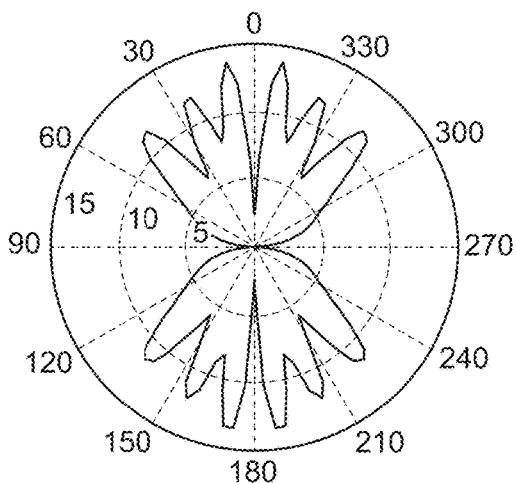
Figure 5B:
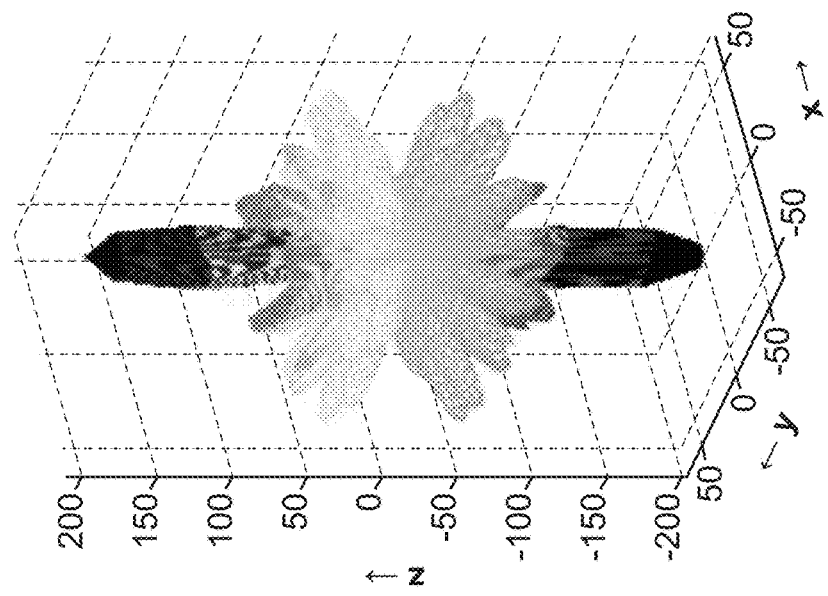
FIGS. 5A and 5B illustrate 3D representations of the transmitted and received radiation patterns at a uniform circular array-Type I and a planar circular array-Type III configuration for OAM state, 'l'=0.
Figure 5A:
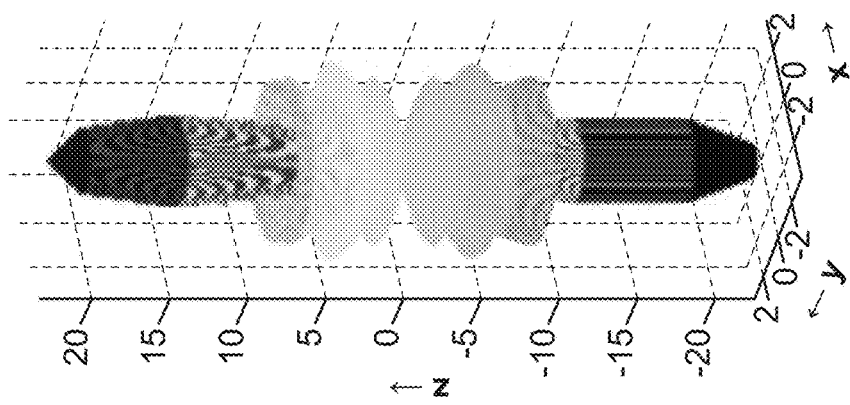
Figure 5D:
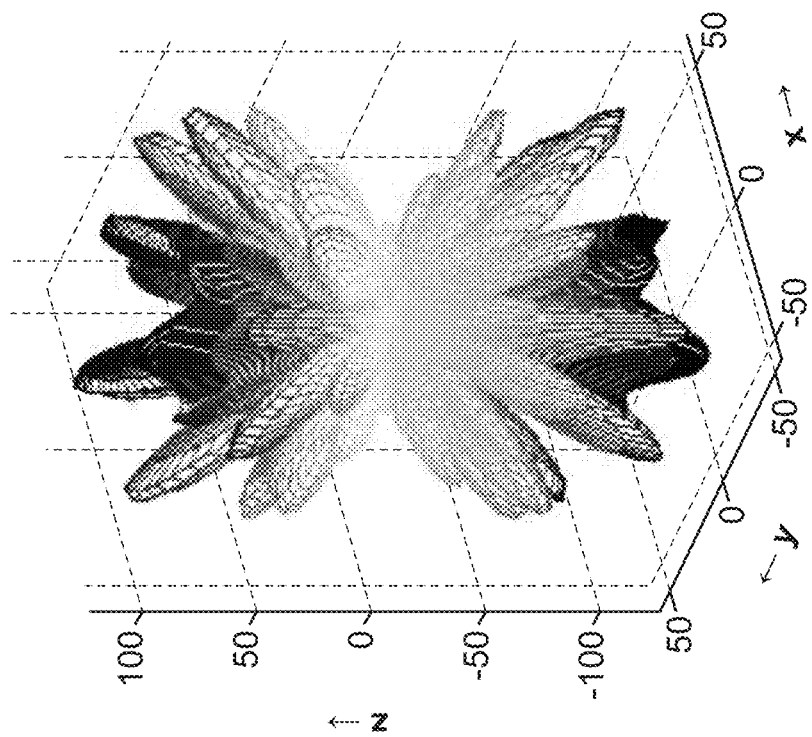
FIGS. 5C and 5D illustrate 3D representations of the transmitted and received radiation patterns at a uniform circular array-Type I and a planar circular array-Type III for OAM state, 'l'=2.
Figure 5C:
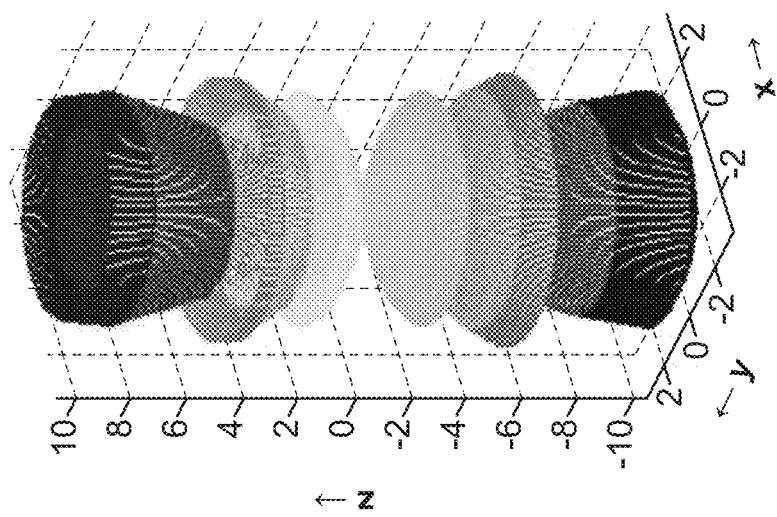
Figure 5F:
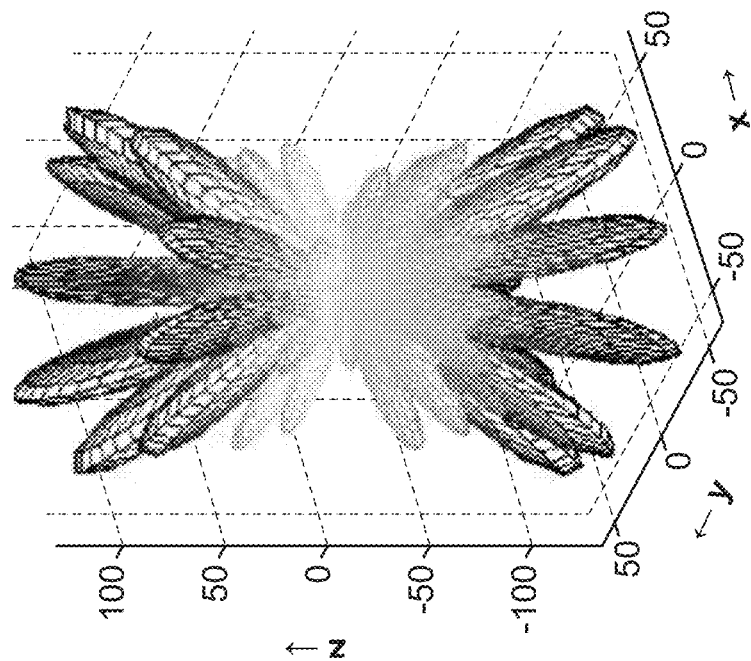
FIGS. 5E and 5F illustrate 3D representations of the transmitted and received radiation patterns at a uniform circular array-Type I and a planar circular array-Type III configuration for OAM state, 'l'=4.
Figure 5E:
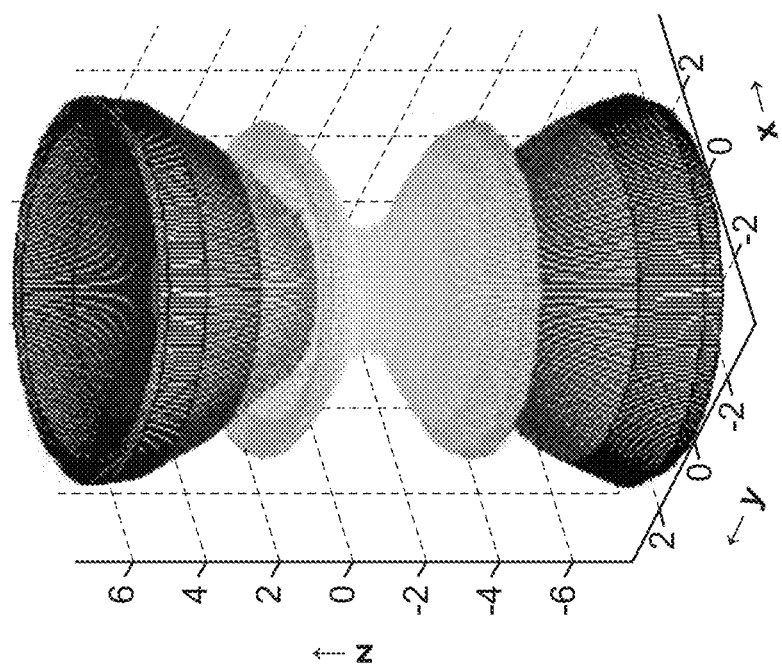

FIG. 3B illustrates an example of a planar uniform circular array-Type III with 10 antenna elements in ring 1 and 9 antenna element in ring 2, and the ring 1 and the ring 2 are arranged on a focal disc along a focal plane. The planar uniform circular array-Type III configuration includes one or more antenna elements arranged in concentric circle such that the antenna elements N=10 to 18 are arranged along the circumference of the inner circle. Further, the antenna elements N=1 to 19 are arranged along the circumference of an outer circle with a one element in the center (1, 9, 9), where the Array Factor is 4 for the planar uniform circular array-Type III configuration.

In the following examples, simulated radiation patterns from the focal plane antenna array system 100 characteristics are shown in FIGS. 4A-4D. The 2D and 3D representations of the transmitted and received radiation patterns for various circular array configurations 110 are shown in FIGS. 4A-4D for OAM state 'l'=4 and FIGS. 5A-5F for state 'l'=0, 2, and 4, respectively. From the illustrations of FIGS. 4A-4D and FIGS. 5A-5F, it has to be noted that as value of 'l' increases, the transmitted radio beams spread out and number of side lobes increases.

On comparing the radiation patterns in FIGS. 3A-3D corresponds to the OAM state 'l'=4 it is observed that there is a considerable difference in the directed power into an angular region of space with reference to antenna type. Similar results were obtained for other values of l (not shown here). For greater precision in the results, and for calculating the antenna parameters, the same configurations were evaluated for their performances using standard radio frequency simulations. Further, FIGS. 5A-5F shows the 3D radiation patterns that correspond to Types I and III. It is observed that as the value of 'l' increases, the beam gets spread out, and the number of side lobes also increase. From these results it is concluded that OAM states 'l'=0, 2, and 4, are transmitted into the far-field of the antenna, and by changing the OAM-state parameter alone it is possible to transmit more than one signal in the same frequency. The results for two configurations for particular OAM state ('l'=0, 2, and 4) are compared in the following tables. Further, the results of the corresponding examples, are tabulated for Type-I and Type-III configurations for various the OAM states 'l'=0, 2, 4 are transmitted into the far-field of the antenna. Transmission of more than one signal in the same frequency is achieved by varying OAM-state parameters, where the various antenna parameters for 'l'=0 in the two types of configurations Type-I and Type-III are mentioned in the following Table 1.

TABLE 1

Values of Various parameter 'l' for = 0 in the two types of configurations

| Parameter | Configuration | |
|---|---|---|
| | Type - I | Type - III |
| Frequency (GHz) | 2 | 2 |
| Main lobe magnitude (dBi) | 2.8 | 4.9 |
| Main lobe direction (degrees) | 109 degrees | 99 degrees |

TABLE 1-continued

Values of Various parameter 'l' for = 0 in the two types of configurations

| Parameter | Configuration | |
|---|---|---|
| | Type - I | Type - III |
| Angular width (3 dB) | 56 degrees | 55.1 degrees |
| Side lobe level (dB) | −2.1 | −1.9 |

Transmission of more than one signal in the same frequency is achieved by varying OAM-state parameters, where the various antenna parameters for 'l'=2 in the two types of configurations Type-I and Type-III are mentioned in the following Table 2.

TABLE 2

Values of Various parameter for 'l' = 2 in the two types of configurations

| Parameter | Configuration | |
|---|---|---|
| | Type - I | Type - III |
| Frequency (GHz) | 2 | 2 |
| Main lobe magnitude (dBi) | 0.6 | 1.9 |
| Main lobe direction (degrees) | 68 degrees | 83 degrees |
| Angular width (3 dB) | 16 degrees | 25.3 degrees |
| Side lobe level (dB) | −2.2 | −2.1 |

Transmission of more than one signal in the same frequency is achieved by varying OAM-state parameters, where the various antenna parameters for 'l'=4 in the two types of configurations Type-I and Type-III are mentioned in the following Table 3.

TABLE 3

Values of Various parameter for 'l' = 4 in the two types of configurations

| Parameter | Configuration | |
|---|---|---|
| | Type - I | Type - III |
| Frequency (GHz) | 2 | 2 |
| Main lobe magnitude (dBi) | 0.1 | 1.8 |
| Main lobe direction (degrees) | 48 degrees | 53 degrees |
| Angular width (3 dB) | 26 degrees | 29 degrees |
| Side lobe level (dB) | −2.4 | −2.8 |

While the embodiments discussed with reference to the figures are indicative, any number of antenna array elements 112 may be arranged in a circular array configuration 110 with N array elements positioned along circumference of 114-M rings with a distance between each element and coupled to a focal plane of the parabolic dish. From FIGS. 4A-4D and FIGS. 5A-5F, a comparison of the radiation patterns between Types I and II configurations it is seen that there is a difference in the directivity or gain of the antenna; also, there is reduction in the magnitude of the side lobe level in the uniform circular centered array-Type II. In the Type III and Type IV configurations, the directivity has increased considerably in comparison to the Type I and II due to the tightly packed array configuration. There is a 10 dB difference in the main lobe magnitude, attributed to an enhanced mutual coupling between the elements that leads to more number of undesirable side lobes. By, using optimization techniques and a suitable array configuration, it is possible to generate helically modulated waves with high directivity and gain, and a reduced presence of side lobes. Taking into account the enormous potential it holds, and the fact that this technology is still in its infancy, the method of OAM modulation could provide a tremendous increase in the spectral efficiency, as well as data security (doubling as a potent encryption scheme) during data transmission.

While the above is a complete description of the preferred embodiments of the invention, various alternatives, modifications, and equivalents may be used. Therefore, the above description and the examples should not be taken as limiting the scope of the invention which is defined by the claims.

I claim:

1. A focal plane antenna array system for transmitting and receiving radio waves, comprising:
    a parabolic dish; and
    a focal plane antenna array comprising one or more antenna elements arranged in a circular array configuration with a number (N) of array elements positioned uniformly along a circumference of a number (M) of rings with a distance between each element and coupled to a focal disc positioned along a focal plane of the parabolic dish such that the focal plane antenna array is configured to transmit radio beam patterns with one or more orbital angular momentum (OAM) states l via a transceiver feed assembly coupled to the parabolic dish;
    wherein the transceiver feed assembly comprises:
        a transmitter adapted to alter excitation phase of the radio beams of successive elements to generate helical wave fronts in the far-field, and receive radio beam patterns with one or more OAM states via the transceiver feed assembly coupled to the parabolic dish; and
        a receiver adapted to process the received helical wave fronts to maximize the amplitude of the received signal, and calculate a total field received by the array through superposition of the fields received by each of the elements.

2. The system of claim 1, wherein the circular array is a uniform circular array with N equidistantly placed array elements, where M is 1 and comprising an array factor given by:

$$AF(\theta, \phi) = \sum_{n=1}^{N} I_0 e^{i(k a \sin\theta \cos(\phi-\phi_n) + \alpha_n + OAM)}$$

wherein $\phi_n$ is the azimuthal angle of the $n^{th}$ element, wherein $$\phi_n = \frac{2\pi n}{N},$$

wherein $\alpha_n = k\alpha \sin\theta \cos(\phi-\varnothing_n)$, and
wherein $\alpha_n$ is the excitation coefficient.

3. The system of claim 2, wherein the circular array comprises nineteen elements arranged in one ring on the focal disc with a radius equal to 1.98 times a wavelength of an operating frequency and wherein the distance between the elements is 0.65 times the wavelength.

4. The system of claim 1, wherein the circular array is a uniform circular centred array with N equidistantly placed array elements, where M is 1 and including a centrally placed element and comprising an array factor given by:

$$AF(\theta, \phi) = 1 + \sum_{n=1}^{N} I_0 e^{i(k a \sin\theta \cos(\phi-\phi_n) + \alpha_n + OAM)}.$$

5. The system of claim 1, wherein the circular array is a planar uniform circular array with N array elements arranged equidistantly in M rings where M>1 and element and comprising an array factor given by:

$$AF(\theta, \phi) = \sum_{m=1}^{M}\sum_{n=1}^{N} I_0 e^{i(k a_{mn} \sin\theta \cos(\phi-\phi_{mn}) + \alpha_{mn} + OAM)}$$

wherein $$\phi_{mn} = \frac{2\pi mn}{N},$$

wherein $\alpha_{mn} = -k\alpha \sin\theta_0 \cos(\phi_0-\phi_n)$, and wherein $$OAM = \frac{2\pi nml}{N}.$$

6. The system of claim 5, wherein the circular array comprises 9 antenna elements arranged along the circumference of an inner circle ring with a radius 1.25 times a wavelength of an operating frequency and 10 antenna elements arranged along the circumference of an outer ring with a radius 1.98 times the wavelength.

7. The system of claim 1, wherein the circular array is a planar uniform circular centred array with N array elements arranged equidistantly in M rings where M>1 and including a centrally placed element and comprising an array factor given by:

$$AF(\theta, \phi) = \sum_{m=1}^{M}\sum_{n=1}^{N} I_0 e^{i(k a_{mn} \sin\theta \cos(\phi-\phi_{mn}) + \alpha_{mn} + OAM)}$$

wherein $$\phi_{mn} = \frac{2\pi mn}{N},$$

$\alpha_{mn} = -k\alpha \sin\theta_0 \cos(\phi_0-\phi_n)$, and $$OAM = \frac{2\pi nml}{N}.$$

8. The system of claim 1, wherein the one or more OAM states is in a range $-N/2 < l < N/2$.

9. The system of claim 8, wherein the one or more OAM states bounds transmission of the generated helical wave fronts corresponding to a value l selected from 0, 2, or 4.

10. The system of claim 1, wherein the antenna array elements are configured to control the current and phase for each element to increase the total field.

11. The system of claim 1, wherein the total field $F_{total}$ is obtained by $E_{total}=E_{singleelement} \times F$, wherein AF is array factor and $E_{singleelement}$ is the field from one single element.

12. A method for transmitting and receiving in a focal plane antenna array, comprising:

providing a parabolic dish coupled to the focal plane antenna array comprising antenna elements arranged in a circular array with a number (N) of array elements positioned along a circumference of a number (M) of rings with a distance between each element and coupled to a focal disc positioned along a focal plane of the parabolic dish and a transceiver feed assembly coupled to the parabolic dish;

transmitting radio beam patterns with one or more Orbital Angular Momentum (OAM) states to the antenna elements via the transceiver feed assembly, wherein the transmitting comprises altering excitation phase of the radio beams of successive elements to generate helical wave fronts in the far-field; and receiving radio beam patterns with one or more OAM states via the transceiver feed assembly, wherein the receiving comprises processing the received helical wave fronts to maximize the amplitude of the received signal and calculating a total field received by the array through superposition of the fields received by each of the elements.

13. The method of claim 12, wherein the total field is obtained by a pattern multiplication rule and a current and a phase for each element are controlled to increase the total field.

14. The method of claim 12, wherein transmission and reception of radio beam patterns in the focal plane antenna array system is achieved using a circular array configuration of antenna elements selected from any one of, a uniform circular array with N equidistantly placed array elements, where M is 1 and comprising an array factor given by:

$$AF(\theta, \phi) = \sum_{n=1}^{N} I_0 e^{i(ka\sin\theta\cos(\phi-\phi_n)+a_n+OAM)},$$

a uniform circular centered array with N equidistantly placed array elements, where M is 1 and including a centrally placed element and comprising an array factor given by:

$$AF(\theta, \phi) = 1 + \sum_{n=1}^{N} I_0 e^{i(ka\sin\theta\cos(\phi-\phi_n)+a_n+OAM)},$$

a planar uniform circular array with N array elements arranged equidistantly in M rings where M>1 and element and comprising an array factor given by:

$$AF(\theta, \phi) = \sum_{m=1}^{M}\sum_{n=1}^{N} I_0 e^{i(ka_{mn}\sin\theta\cos(\phi-\phi_{mn})+a_{mn}+OAM)},$$

and a planar uniform circular centered array with N array elements arranged equidistantly in M rings where M>1 and including a centrally placed element and comprising an array factor given by:

$$AF(\theta, \phi) = \sum_{m=1}^{M}\sum_{n=1}^{N} I_0 e^{i(ka_{mn}\sin\theta\cos(\phi-\phi_{mn})+a_{mn}+OAM)}.$$

15. The method of claim 12, wherein transmission of more than one radio beam in the same frequency is achieved by varying OAM state parameters.

* * * * *